US006769842B2

(12) United States Patent
Nerlich et al.

(10) Patent No.: US 6,769,842 B2
(45) Date of Patent: Aug. 3, 2004

(54) CUTTER PLATE AND MILLING TOOL

(75) Inventors: Michael Nerlich, Kusterdingen-Wankheim (DE); Thomas Digel, Gomaringen (DE)

(73) Assignee: Walter AG, Tubingern (DE)

( * ) Notice: Subject to any disclaimer, the term of this patent is extended or adjusted under 35 U.S.C. 154(b) by 136 days.

(21) Appl. No.: 10/237,856

(22) Filed: Sep. 10, 2002

(65) Prior Publication Data

US 2003/0063954 A1 Apr. 3, 2003

(30) Foreign Application Priority Data

Sep. 10, 2001 (DE) .......................................... 101 44 542

(51) Int. Cl.[7] .................................................. B26D 1/12
(52) U.S. Cl. .............................. 407/61; 407/33; 407/48; 407/53
(58) Field of Search .............................. 407/61, 33, 48, 407/53, 62, 67, 113, 114

(56) References Cited

U.S. PATENT DOCUMENTS

| 4,097,174 A | * | 6/1978 | Heinlein | ...................... | 407/46 |
| 4,433,948 A | * | 2/1984 | Kodama | ...................... | 407/42 |
| 4,632,608 A | | 12/1986 | Blomberg et al. | | |
| 5,074,721 A | * | 12/1991 | Kress et al. | ................. | 407/119 |
| 5,209,611 A | | 5/1993 | Drescher | | |
| 6,050,757 A | * | 4/2000 | Gesell | ......................... | 409/132 |
| 6,146,063 A | | 11/2000 | Ramold et al. | | |
| 6,374,712 B1 | | 4/2002 | Müller et al. | | |
| 6,503,030 B2 | * | 1/2003 | Kress et al. | ................. | 408/188 |

FOREIGN PATENT DOCUMENTS

| DE | 0162029 | 11/1985 |
| DE | 195 46 197 C1 | 1/1997 |
| DE | 0830 228 B1 | 3/1998 |
| DE | 197 39 300 A1 | 3/1999 |
| DE | 197 39 366 A1 | 3/1999 |
| DE | 197 93 366 A1 | 3/1999 |
| DE | 197 43 971 A1 | 4/1999 |
| DE | 199 27 545 A1 | 12/2000 |
| DE | 100 06 381 A1 | 8/2001 |
| JP | 5-50315 A | 3/1993 |
| JP | 2000-126922 A | 5/2000 |

* cited by examiner

*Primary Examiner*—Willmon Fridie, Jr.
(74) *Attorney, Agent, or Firm*—Venable LLP; Chad C. Anderson

(57) ABSTRACT

Cutter plates (19) with an approximately cube-shaped base body have been created, in particular for finish-milling of a crankshaft (5). At the edge of its cover surface, the base body is provided with a hump or protrusion, which can be embodied rib- or strip-shaped, has a cutting edge each on its front and back and adjoins the neighboring lateral surface. This cutting edge is a component of the main cutting edge (33) adjoining the cover surface. A corresponding protrusion (29) is provided on the lower end of the lateral surface (27) and adjoins the end of the cover surface (22) remote from the protrusion (28). In this case the lateral surface (27) is preferably inclined in such a way that it terminates flush with the protrusion (29) without forming a concave surface area with it. A corresponding milling tool can be completely and exclusively equipped with such cutter plates and can process in one work step the cylinder surface (14) of a crank pin, corresponding relief grooves (15, 16) toward both edges of the cylinder surface (14), and adjoining end faces (17, 18). In the course of this a higher number of cutting edges is provided in the area of the relief grooves (15, 16), than for the cylinder surface (14). Thus a particularly high degree of processing quality is achieved in the area of the relief grooves (15, 16) in particular. The relief grooves (15, 16) are designed in a production-friendly manner without trade-offs regarding processing quality and precision.

18 Claims, 5 Drawing Sheets

Figure 1:
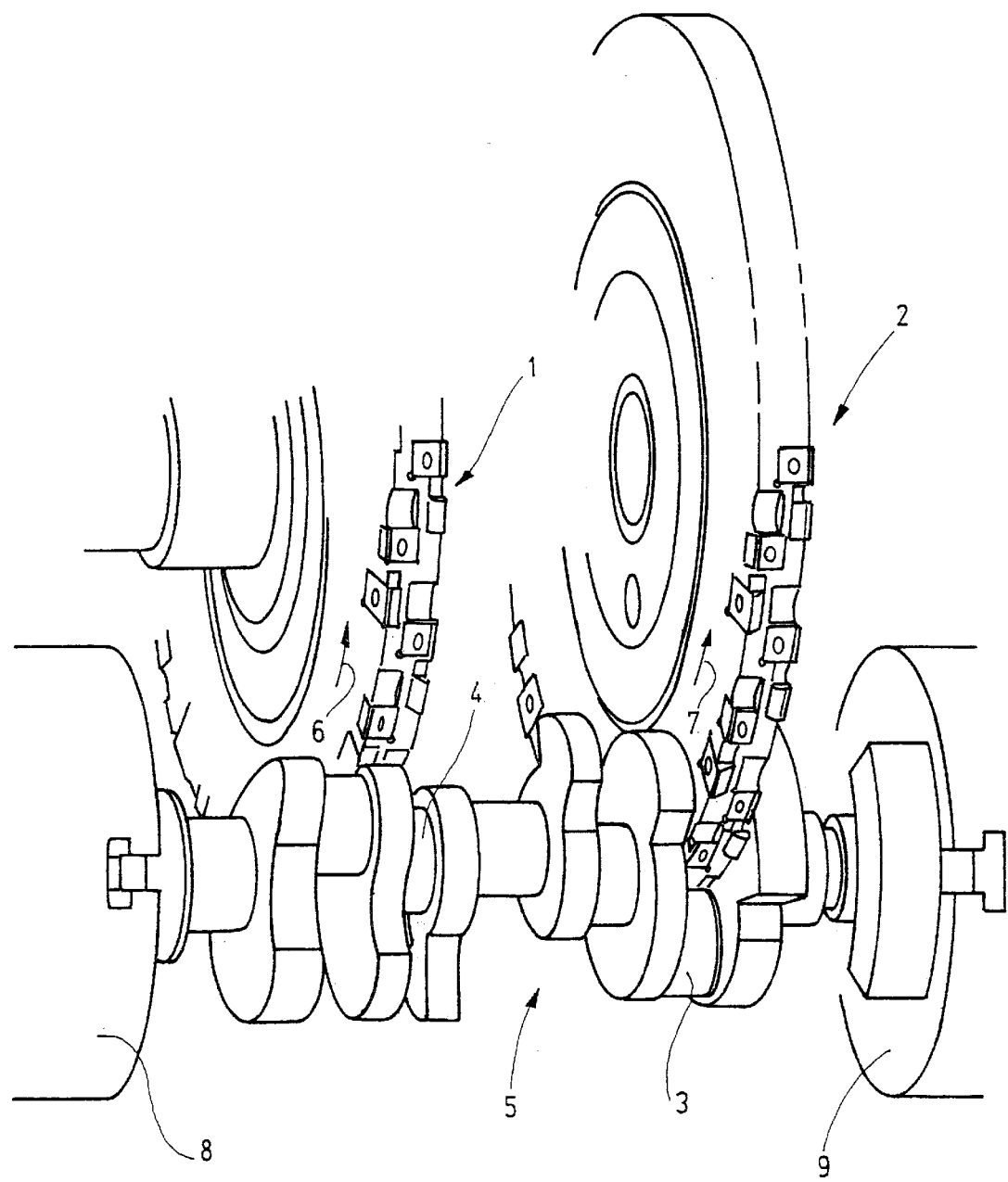

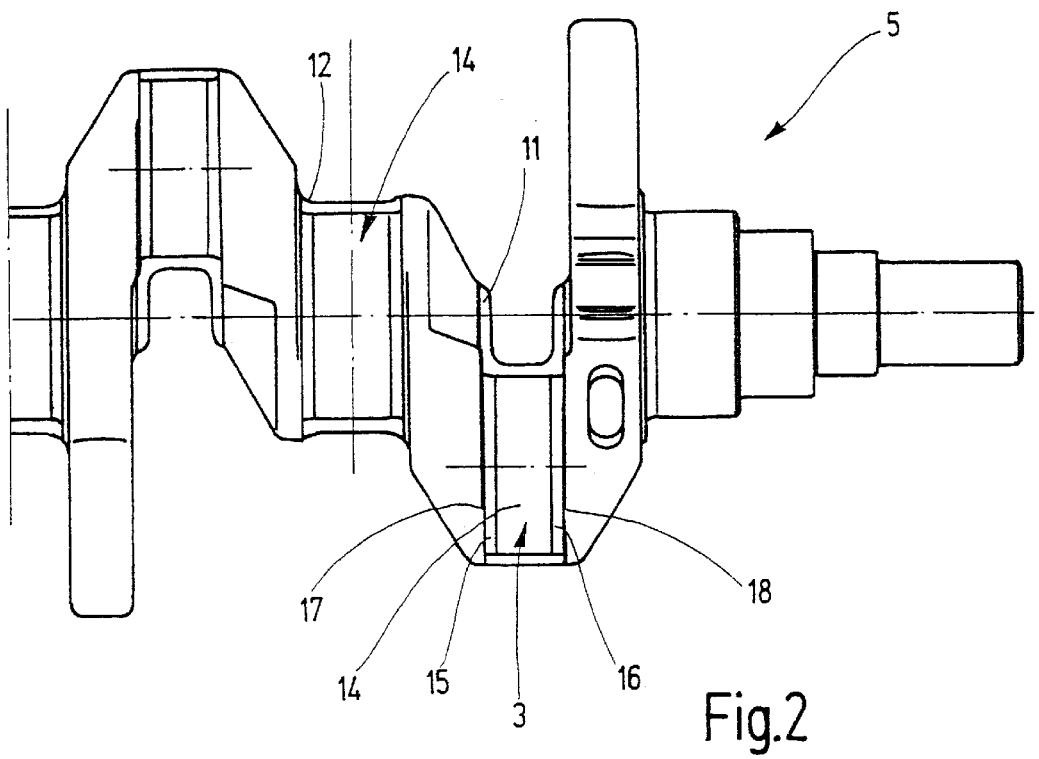
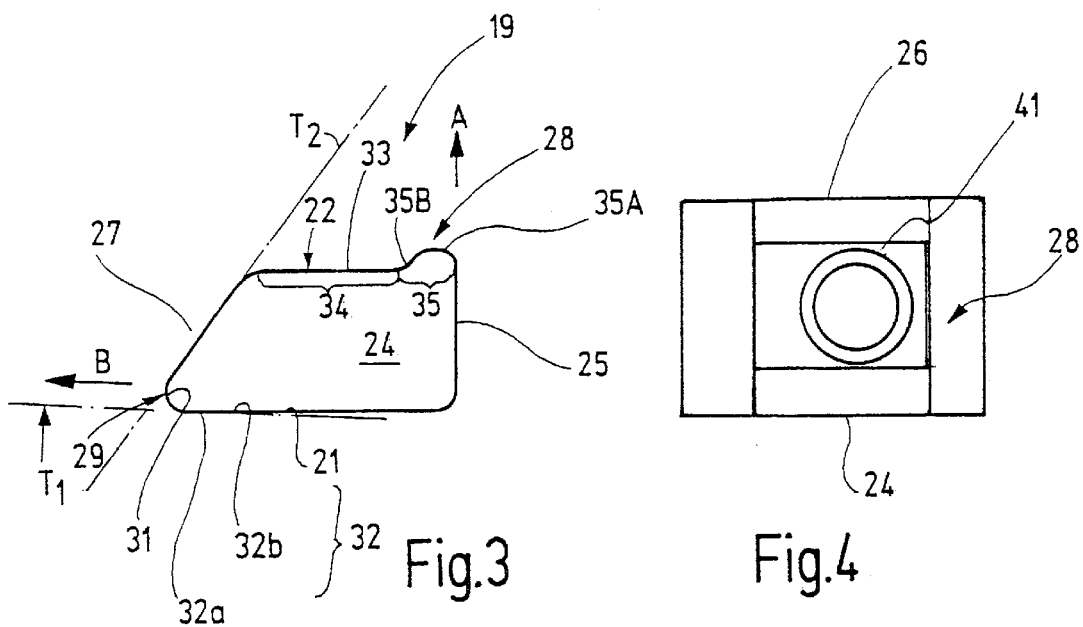

CUTTER PLATE AND MILLING TOOL

The invention relates to a cutter plate which is particularly suitable for finishing cutters, in particular crankshaft finishing cutters.

It is necessary in the course of processing crankshafts to perform further processing steps, for example finish-milling steps, on a crankshaft blank or on a crankshaft which was pre-processed by means of rough milling. In the course of this processing it can become necessary, for example, to work the cylinder faces of cylindrical pins and simultaneously the flat surfaces adjoining the pin. For example, this relates to the crank pin, as well as the surfaces adjoining the crank pin, the so-called oil collars. A so-called relief groove is often provided between the flat surfaces and the cylinder face of the pin, which is also intended to be produced by means of a milling process.

As a rule, further processing steps follow the milling process, which can include, for example, grinding operations on the cylindrical pins and roller-burnishing processes on the relief groove. It is attempted here to perform the milling operation with such a quality that the subsequent processing operations can be reduced to a necessary minimum.

A disk milling cutter and a reversible plate suitable for this are provided by DE 197 39 366 A1, wherein the reversible plates are maintained in a radial direction against the tool body as so-called radial plates. The radial cutter plates are rectangular plates which have protrusions on two radially oppositely located corners, which are used for forming the relief groove at the crankshaft.

With this milling tool the same number of active cutters results for forming the relief grooves as for the other surfaces to be worked. However, an increased chip removal volume results in the area of the relief grooves, compared with the area of the cylinder face, for example. Moreover, the number of active cutter edges in the area of the circumferential surface is increased when it is intended to process particularly slim crank pins, so that succeeding reversing cutter plates overlap each other to a greater extent. As a result the lengths of the cutting arcs are then larger in the area of the relief groove than in the area of the crank pin, which can result in an increased outlay for finishing work at the relief groove.

The object on which the invention is based is derived from this, namely to create a cutter plate for a milling tool, as well as a suitable milling tool, which makes it possible to mill the oil collar, the relief groove and the crank pin of a crankshaft with the same tool in one operation, after which a finish-milling process, for example, finish-grinding, of only the crank pin should be required.

This object is attained by means of the cutter plate in accordance with claim 1, as well as the milling tool in accordance with claim 14.

The cutter plates are so-called tangential plates, i.e. they are designed for being mounted in plate seats the normal surface line of the bearing surface of which approximately points in the radial direction or the axial direction. In this case a surface of the plate seat is considered to be the bearing surface, against which the cutter plate is braced by means of a fastening device, for example a clamping screw. The tangential plate concept makes possible an increase in the number of teeth in the area of the relief grooves, even in connection with very slim crank pins, provided the cutter plates in accordance with the invention are employed. These have at least one protrusion on their cover surface for forming the relief groove, and at least one other protrusion on a lateral surface. It is possible in this way to assign a cutter plate seated on a bearing surface with an axial normal surface line to each cutter plate seated on a bearing surface with a radial normal surface line. This arrangement results in two cutting edges for the relief groove and one cutting edge for the cylinder face. The cutting edge for the cylinder face is constituted by a straight main cutting edge section. This arrangement results in particularly short cutting arc lengths in the relief groove. Remaining processing traces can be removed in a simple roller-burnishing process. If the processing accuracy following the finish-milling process is sufficient, the roller-burnishing process can be omitted.

Moreover, the result of roller-burnishing substantially depends on the quality of pre-processing. A very smooth surface (short lengths of the cutting arc) is already achieved prior to roller-burnishing by means of the finishing cutter of the invention and the cutter plate of the invention, so that again a very good roller-burnishing result can be achieved. Extensive tensions occur in the area of the relief groove during the subsequent operation of the crankshaft. Here the surface quality in the relief groove determines the tendency for the formation of cracks, and therefore the load-bearing ability of the crankshaft.

The first protrusion formed on the cutter plate can extend over the entire length of the cover surface of the cutter plate and can therefore extend from the lateral surface, which leads during use, to the lateral surface, which trails during use. In this case the protrusion is embodied as a rib oriented in the direction of movement. This constitutes a solution which can be easily produced and is rugged. However, if needed, this protrusion can also be interrupted in its center, so that it is for example divided into two protrusions arranged on the cover surface. The same applies correspondingly to the second protrusion arranged on a lateral surface of the cutter plate. In a view of the lateral surface which leads during its employment, or the lateral surface which trails during its employment which, for example, can be designed to be approximately trapezoidal, it can be seen that the protrusions are arranged on corners which are located diagonally across from each other, but on surfaces of the cutter plate which have a common edge, i.e. which adjoin each other. The installed positions of the cutter plates, wherein the first protrusion and wherein the second protrusion are active, differ correspondingly by a turn of approximately 90°. This corresponds to the different radial, or axial, orientation of the plate seats.

The protrusions have matching contours, i.e. matching cutting edges. This is in the sense that the main cutting edge of the first protrusion can be brought to overlap the main cutting edge of the second protrusion, once the cutter plates have been properly positioned. Because of this, both protrusions can be employed for forming the exact same relief groove and can remove chips of approximately the same thickness.

For example, the protrusions can be embodied as ribs which are arranged substantially parallel in respect to each other, thus in both installed positions each of the ribs points in the circumferential direction of the milling tool.

The cutter plate preferably has a cover surface which is divided into two surface areas, between which there is a recess. The surface areas can be narrow strip-shaped areas, for example, which are located on a common plane and each of which is adjoined by main cutting edges. The same as the lateral surfaces and the base surface of the cutter plate, these surface areas are preferably ground in order to obtain a precise work result at the crankshaft. While the other surfaces are embodied to be flat or convex, the cover surface has a concavely arched section. The latter is located at the base of the protrusion. The division of the cover surface into narrow, for example strip-shaped surface areas, between which the cover surface is located slightly lower, allows the grinding treatment of the cover surface with a grinding tool having only one grinding edge, in that the volume of material to be removed during the grinding process is minimized. The section between the two surface areas can remain rough. In this case the two ground cover surface areas constitute a precisely worked surface, which can be used as a bearing surface when the second protrusion is active (axially oriented plate seat in relation to the normal surface line of the bearing surface, also called "lateral plate seating"). The position of the main cutting edge is furthermore precisely fixed by the grinding process (radially oriented plate seat in relation to the normal surface line of the bearing surface, also called "tangential plate seating").

Figure 5:
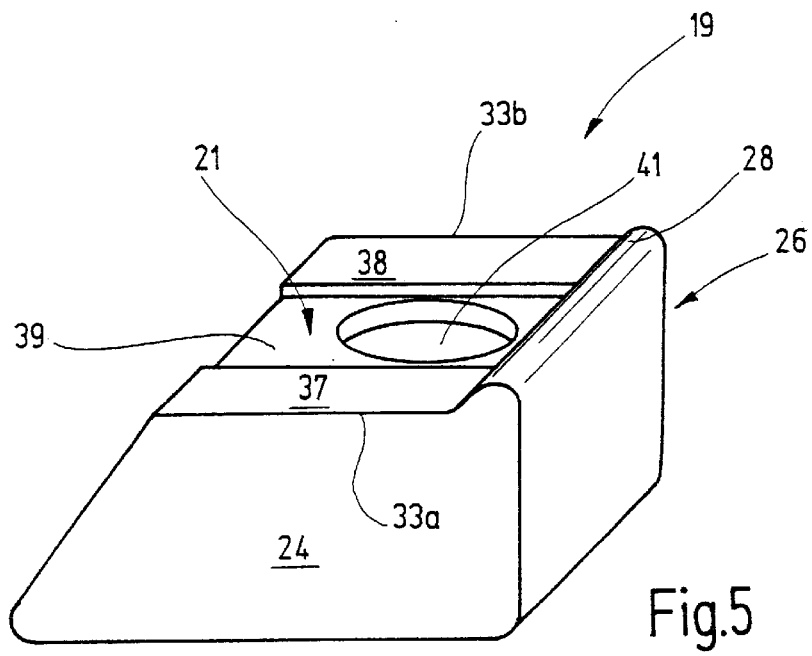
Figure 6:
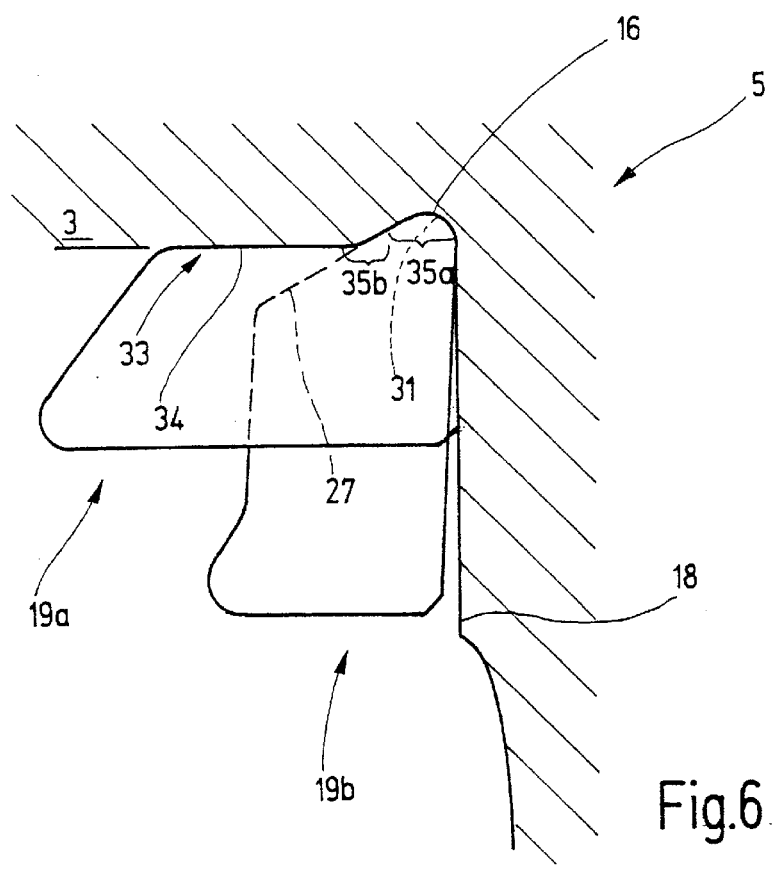
Figure 7:
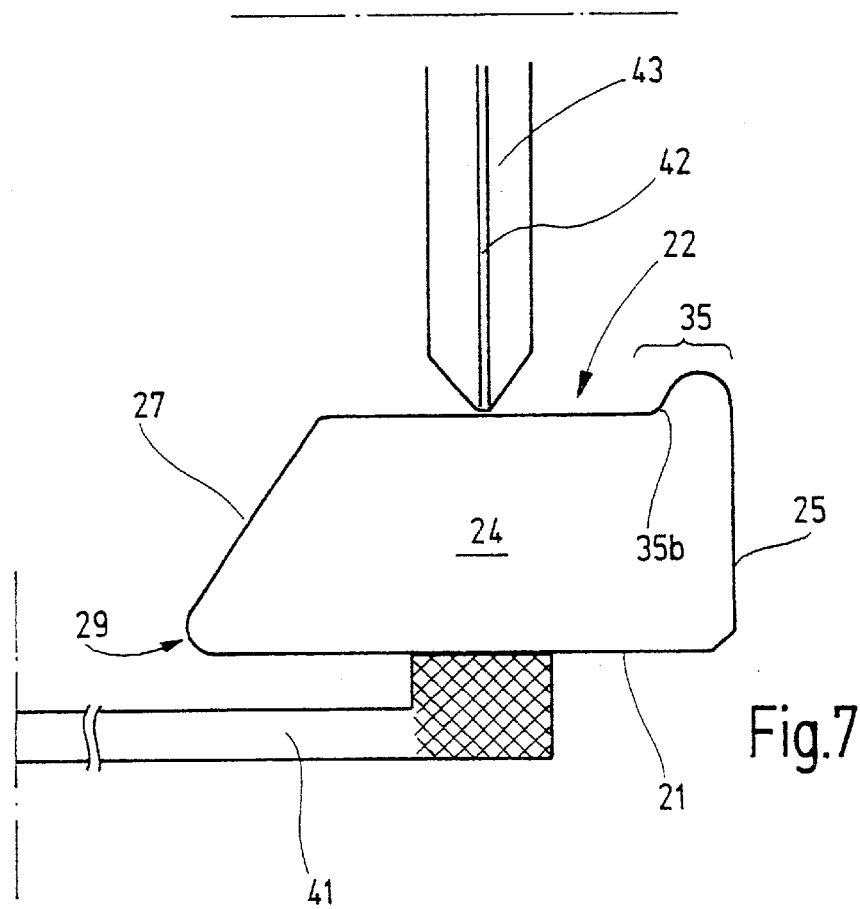
Figure 8:
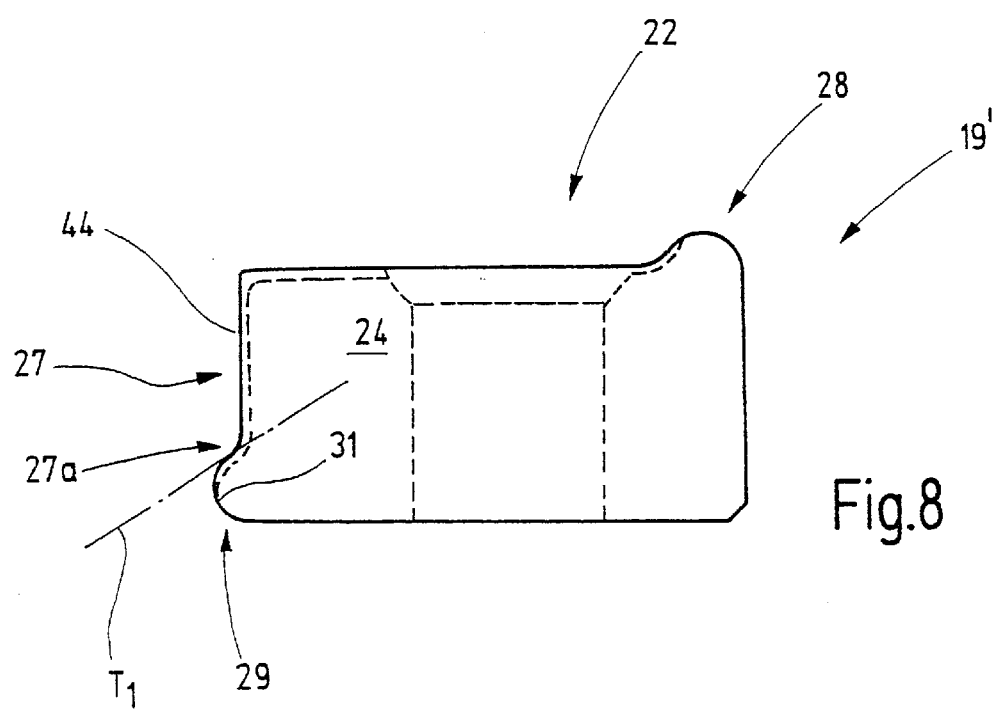
Figure 9:
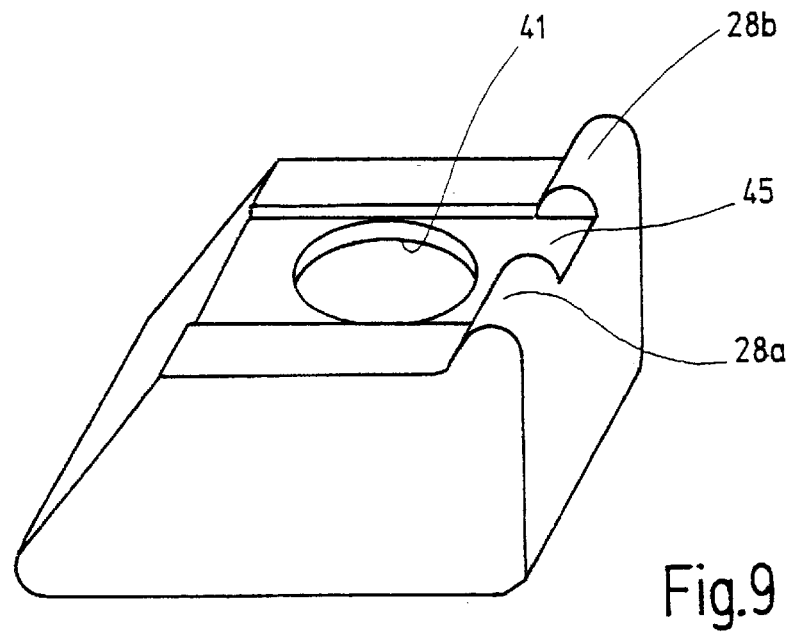
Figure 10:
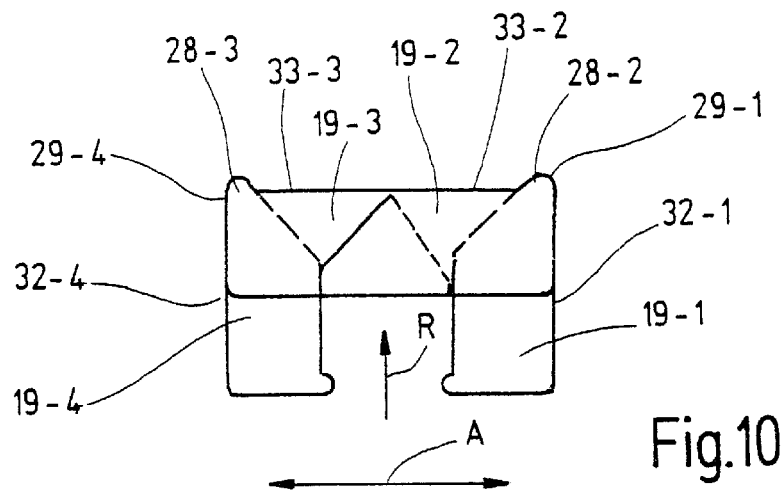
Figure 11:
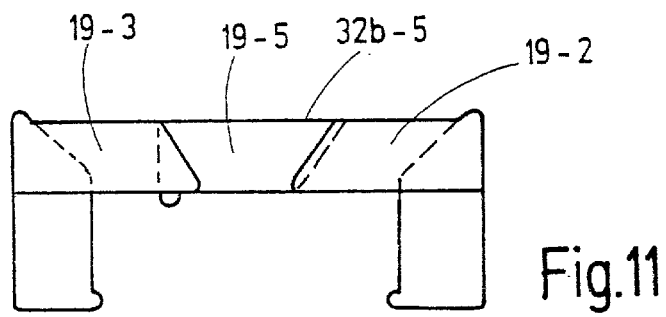

Further details of advantageous embodiments of the invention ensue from the dependent claims, the drawings or the description. Exemplary embodiments of the invention are illustrated in the drawings. Shown are in:

FIG. 1, a perspective schematic view of two milling tools in accordance with the invention during the finish-milling processing of a crankshaft, FIG. 2, the crankshaft to be processed with material areas to be appropriately removed, FIG. 3, the cutter plate of the invention in a lateral view, FIG. 4, the cutter plate in a view from above, FIG. 5, the cutter plate in a perspective view, FIG. 6, two cutter plates of the milling tool during the milling process, FIG. 7, the application of grinding tools to the cutting plate for producing the cutting plate, FIG. 8, an altered embodiment of the cutter plate, FIG. 9, a further altered embodiment of the cutter plate, FIG. 10, the overlapping of cutter plates at the milling tool in a schematized representation, and FIG. 11, an altered cutter plate arrangement on a milling tool.

Two milling tools 1, 2, which are identically designed, are illustrated in FIG. 1, and are designed as disk milling cutters and are used for the finish-milling processing of crank pins 3 of crankshafts, or other pins, for example bearing journals 4 of a crankshaft 5. In this case the milling tools 1, 2 are attached to appropriate machine spindles, not represented, and are rotatingly driven, as indicated by the arrows 6, 7. The crankshaft 5 is held in appropriate chucks 8, 9.

The crankshaft 5 is again illustrated in FIG. 2. The contour to be produced is represented in heavy solid lines. Initially the crank pin 3 of the crankshaft, as well as the bearing journal 4, are oversized or have excessive size, i.e. there is material 11, 12 which must be removed, which is indicated by dash-dotted lines in FIG. 2. Following the removal thereof, the crank pin 3 of the crankshaft should have a cylinder surface face 14, which is adjoined on both sides by relief grooves 15, 16. End faces 17, 18 (so-called oil collars) are then formed on both sides of the relief grooves. To form these surfaces in the course of a finish-milling process, the disk milling cutters 1, 2 are equipped with uniform cutter plates 19, illustrated in FIGS. 3 to 5. The cutter plates 19 are embodied as tangential plates. The cutter plates 19 have a base surface 21, a cover surface 22, preferably parallel in respect to the latter, as well as lateral surfaces 24, 25, 26, 27. A first protrusion 28 is formed on the lateral edge of the cover surface 22 adjoining the lateral surface 25. As can be seen in FIG. 4, it extends from the lateral surface 24 as far as the lateral surface 26. It makes a level (without a concave curvature) transition into the lateral surface 25. A second protrusion 29 is provided on the lateral surface 27, which makes a level, i.e. without a concave curvature, transition into the lateral surface 27. The protrusions 27, 29 point in different directions A, B, which are fixed by the direction of their feed movements. As represented in FIG. 3, the directions A, B can be fixed to extend vertically in respect to each other.

With the lateral surface 24, the protrusion 29 encloses a main cutting edge 31, curved in an arc shape, whose shape corresponds to the contour of the relief grooves 15, 16 to be produced. Emerging from the curvature of the main cutting edge 31, the lateral surface 27 adjoins this curvature tangentially. In this way the inclination of the lateral surface 27 in relation to the base surface 21 is fixed at an angle which is determined by the tangent lines T1, T2 applied to the ends of the cutting edge 31. In the course of this a bevel, which is inclined at an obtuse angle in relation to the remaining base surface 21, can be provided in the base surface 21 adjoining the cutting edge 31, i.e. the tangent line T1 can be inclined at an acute angle in respect to the base surface 21.

Together with the base surface 21, the lateral surface 24 borders a substantially straight edge 32 with, depending on the installed position of the cutter plate 19, is inactive or is used as auxiliary cutting edge. In the case illustrated in FIG. 3, the edge 32 forms an auxiliary cutting edge 32a adjoining the main cutting edge 31, and is adjoined by a base surface edge 32b at an obtuse angle. Normally the base surface edge 32b is not used as a cutting edge.

The protrusion 28 and the cover surface 22 adjoin the lateral surface 24 and define, together with the latter, a further main cutting edge 33, which has a straight section 34 and an arc-shaped section 32. The arc-shaped, or curved, section 35 has a convexly curved section 35a and a concavely curved section 35b, by means of which it makes a transition into the straight section 34. The contour of the section 35a matches the main cutting edge 31. This can be seen in FIG. 6 in particular, which illustrates two cooperating cutter plates 19a, 19b. The main cutting edge 31 (dashed reference line) and the cutting edge section 35a determine in a matching manner the concave contour of the relief groove 16. In contrast thereto, the cutting edge section 35b of the cutting edge 19a by itself provides the transition from the relief groove 16 to the crank pin 3, and thus to the straight section 34 of the main cutting edge 33. In this way no concave curvature at all is required on the lateral surface 27 of the cutting edge 19b, and it can therefore be produced by means of a simple surface grinding process. This is correspondingly true for the lateral surface 25.

In an advantageous embodiment, such as illustrated in FIG. 5, the cover surface 21 of the cutter plate 19 is divided into surface areas 37, 38, which are located on a common plane. Each of the surface areas 37, 38 directly adjoins the neighboring main cutting edge 33a, 33b, which represent the transition to the respective lateral surface 24, 26. A surface area 39, which lies lower than the surface areas 37, 38, is arranged between the strip-shaped bearing surfaces 37, 38, which make a transition into the protrusion 28 by means of a concave curvature. While the surface areas 37, 38 are precision-ground, the surface area 39 can remain rough, i.e. can have the respective tolerances which occur in the course of sintering the cutter plate, which is preferably made of tungsten carbide or a hard metal (or ceramic material). However, a precise position of the main cutting edges 33a, 33b is achieved by means of the grinding processing of the surface areas 37, 38, as well as a precise positioning of the cutter plate 19 when the surface areas 37, 38 are used as bearing surfaces (second installed position).

This design of the cutter plate has substantial advantages in respect to its production, as illustrated in FIG. 7. While the base surface 21 and the lateral surfaces 24 to 27 are end faces, which are merely adjoined by means of convex sections, such as the protrusion 29 or the respective edges, for example, these end faces and the convex surface areas can be produced by means of cost-efficient surface grinding processes, for example by means of a cup wheel 41. But this does not apply to the cover surface 22. There, a surface grinding process is impermissible because of the concave portion of the cover surface 22, which is adjoined by the cutting edge 35b. The level portion of the former can also not be worked by means of a surface grinding process, because then a shoulder toward the curved cutting edge 35 would result. However, because of the limitation of the cover surface 22 which must be ground off to only those areas which directly adjoin the cutting edge 33a, 33b, a very small volume of material to be removed results, so that a grinding tool 43 provided with a grinding edge 42 can be employed without the productivity of the manufacturing process being too greatly hindered. Thus, the interruption of the cover surface 22 by the surface area 39 has considerable advantages in respect to the production of the cutter plate 19.

The cutter plate 19 is provided with a fastening opening 41, which extends from the cover surface 22 to the base surface 21. For example, the fastening opening is provided between the surface areas 37, 38.

FIG. 8 illustrates an altered embodiment of a cutter plate 19'. It differs from the previously described cutter plate 19 by the arrangement and design of the lateral face 27. Starting at the tangent line T1 it is differently inclined at the end of the main cutting edge 31, from which a concave lateral surface area 27a results. Therefore the lateral surface 27 can no longer be processed by means of a surface grinding method. Accordingly the lateral surface 27 is embodied similar to the cover surface 22, i.e. it is provided with a wide recess approximately in the center, so that only two strips are created at the edges, which must be ground with the grinding tool 43. This embodiment has the advantage that the edge 44 formed between the lateral surface 27 and the lateral surface 24 can be used as a main cutting edge if this should be necessary in individual cases. Then the edge 44 is used for working the cylinder surface 14. To this end, the cutter plate 19' is mounted with its cover surface 21 on a bearing surface of a plate seat with a normal axial area.

An alteration which is possible in principle is moreover represented in FIG. 9. The specialty of this embodiment rests only in a disruption 45 formed in the protrusion 28. The latter is therefore divided into two individual protrusions 28a, 28b. In each one of the embodiments represented, the cutter plate 19 is a precision cutter plate, which is ground on all six sides and in the area of its protrusions 28, 29. It is suitable for finish-milling in the following way:

The arrangement of four cutter plates in the milling tool 1 or 2 in accordance with FIG. 1 is schematically represented in a circumferential projection in FIG. 10. A first cutter plate 19-1 is mounted on a plate seat, whose bearing surface has a normal axial surface. In FIG. 10 the axial direction is shown by an arrow A. In this case the cutter plate 19-1 is oriented in such a way that its protrusion 29-1 is maintained in an active cutting position. The auxiliary cutting edge 31-1 is also active.

The associated cutter plate is a cutter plate 19-2, which is mounted on a tangentially oriented plate seat, whose bearing surface has a normal axial surface pointing in the radial direction R. The cutter plate 19-2 is seated and maintained in such a way that its protrusion 28-1 is aligned with the protrusion 29-1 in the circumferential direction of the cutting tool 1 or 2. Thus the main cutting edge 33-2 adjoins the protrusion 28-2 smoothly.

The left cutting edges of the disk milling cutter are designed in a corresponding laterally reversed configuration. The cutter plates 19-3 and 19-4 are provided for this. The main cutting edge 33-3 of the cutter plate 19-3 adjoins the cutting edge 33-2 of the cutter plate 19-2 in a directly overlapping manner. The protrusions 28-3 and 29-4 of the cutter plates 19-3, or 19-4 again overlap. In this configuration, two main cutting edges are provided for each relief groove 15, 16 (see FIG. 2), namely the main cutting edges of the protrusions 28-2 and 29-1 for the relief groove 16, and the main cutting edges of the protrusions 29-4, as well as 28-3, for the relief groove 15. A complete cutting edge formed by the cutting edges 19-2 and 19-3 is provided for the cylinder surface of the crankcase pin 3, or a possible crankcase journal 4. In addition, respective cutting edges 324, or 32-1, are provided as auxiliary cutting edges for both end faces 17, 18.

In the course of performing the milling work, the milling cutter 1 or 2 illustrated in FIG. 1 rotates in the direction of the arrow 6 or 7. The crankshaft 5 is simultaneously rotated, while the milling tools 1, 2 can perform a corresponding oscillating compensating movement. With an increase in feeding, which is achieved by reducing the distance between the crank pin 3 and the milling tool 2 (or 1), the protrusions 28, 29 of the cutter plates of the milling tool first remove the material areas 11, 12 illustrated in FIG. 2. Only when the straight sections of the main cutting edges 33 reach the excess material of the crank pin 3 or the bearing journal 4, they come into cutting contact with the crankshaft 5 and start to remove material. In this state the number of cutting edges of the protrusions 28, 29 producing the relief grooves 15, 16 is twice as large as the number of cutting edges for producing the cylindrical areas of the crankshaft pin 3 or of the bearing journal 4. In this way a particularly short cutting arc length, and therefore a particularly great surface quality is achieved in the area of the relief grooves 15, 16, which enhances the quality of the crankshaft.

FIG. 11 shows another application option of the cutter plate 19 of the invention. The arrangement in accordance with FIG. 11 is based on the arrangement in accordance with FIG. 10, wherein an additional cutter plate 19-5 has been inserted between the cutter plates 19-2 and 19-3. Here, the base surface edge 32b-5 of the latter is used as the main cutting edge. By means of this configuration it is possible to produce crankshaft pins of any arbitrary width by means of the uniform cutter plate 19.

Cutter plates 19 with an approximately cube-shaped base body have been created, in particular for finish-milling of a crankshaft 5. At the edge of its cover surface, the base body is provided with a hump or protrusion, which can be embodied rib- or strip-shaped, has a cutting edge each on its front and back and adjoins the neighboring lateral surface. This cutting edge is a component of the main cutting edge 33 adjoining the cover surface. A corresponding protrusion 29 is provided on the lower end of the lateral surface 27 and adjoins the end of the cover surface 22 remote from the protrusion 28. In this case the lateral surface 27 is preferably inclined in such a way that it terminates flush with the protrusion 29 without forming a concave surface area with it. A corresponding milling tool can be completely and exclusively equipped with such cutter plates and can process in one work step the cylinder surface 14 of a crank pin, corresponding relief grooves 15, 16 toward both edges of the cylinder surface 14, and adjoining end faces 17, 18. In the course of this a higher number of cutting edges is provided in the area of the relief grooves 15, 16, than for the cylinder surface 14. Thus a particularly high degree of processing quality is achieved in the area of the relief grooves 15, 16 in particular. The relief grooves 15, 16 are designed in a production-friendly manner without trade-offs regarding processing quality and precision.

What is claimed is:

1. A cutter plate (19), in particular for crankshaft finishing cutters (1, 2), having a base body with a base surface (21), a cover surface (22), as well as lateral surfaces (24, 25, 26, 27), which are arranged between the base surface (21) and the cover surface (22), having at least one first protrusion (28), which is arranged on the cover surface (22) adjoining a lateral surface (25), having at least one first main cutting edge (33) with a straight section (34) defined between one of the lateral surfaces (24) and the cover surface (22), and a curved section (35) formed on the protrusion (28), and having at least one second protrusion (29), which is arranged on a lateral surface (27) adjoining the base surface (21) and has a second main cutting edge (31), which is curved.

2. The cutter plate in accordance with claim 1, characterized in that the curved section (35) of the first main cutting edge (33) and the second main cutting edge (31) are embodied to match each other at least in sections.

3. The cutter plate in accordance with claim 1, characterized in that the first protrusion (28) is constituted by a rib, which extends parallel in relation to the adjoining lateral surface (25).

4. The cutter plate in accordance with claim 1, characterized in that the second protrusion (29) is constituted by a rib, which extends parallel in relation to the adjoining base surface (21).

5. The cutter plate in accordance with claim 4, characterized in that the ribs are embodied parallel in relation to each other.

6. The cutter plate in accordance with claim 1, characterized in that the base surface (21), together with the lateral surface (24) which adjoins the straight section (34) of the main cutting edge (33), delimits a base surface edge (32*b*).

7. The cutter plate in accordance with claim 6, characterized in that the auxiliary cutting edge (32) is longer than the distance between the straight section (34) of the main cutting edge (33) and the base surface edge (32*b*).

8. The cutter plate in accordance with claim 1, characterized in that the lateral surface (24) adjoining the straight section (34) of the main cutting edge (33) is embodied to be level.

9. The cutter plate in accordance with claim 1, characterized in that the lateral surface (24) adjoining the straight section (34) of the main cutting edge (33) forms a right angle with the base surface (21).

10. The cutter plate in accordance with claim 1, characterized in that the straight section (34) of the main cutting edge (33) is of a length which is greater than the distance of the straight section (34) of the main cutting edge (33) from the auxiliary cutting edge (32).

11. The cutter plate in accordance with claim 1, characterized in that the cover surface (22) has at least two surface areas (37, 38), which are spaced apart from each other and are located on a common plane.

12. The cutter plate in accordance with claim 11, characterized in that the surface areas (37, 38) adjoin the respective lateral surface (24, 26).

13. The cutter plate in accordance with claim 1, characterized in that the cutter plate (19) has a fastening opening (41).

14. The cutter plate in accordance with claim 1, characterized in that the protrusions (28, 29) are oriented in directions (A, B) which form an obtuse angle with each other.

15. The cutter plate in accordance with claim 1, characterized in that the protrusions (28, 29) are oriented in directions (A, B) which form a right angle with each other.

16. A milling tool with cutter plates in accordance with claim 1, having a first group of plate seats, in which the first protrusions (28-2, 28-3) of the cutter plates (19-2, 19-3) are arranged in the active position, and having a second group of plate seats, in which the second protrusions (29) of the cutter plates (19-1, 19-4) are arranged in the active position.

17. The milling tool in accordance with claim 16, characterized in that each plate seat has a bearing surface, wherein the bearing surfaces of the plate seats of the first group have a radially oriented normal surface line, and the bearing surfaces of the second group have an axially oriented normal surface line.

18. The milling tool in accordance with claim 17, characterized in that the cutter plates (19-2, 19-3) in the first group of plate seats rest with their base surfaces (21) on the bearing surface, and that the cutter plates (19-1, 19-4) in the second group of plate seats rest with their cover surface (22), or the surface areas (37, 38) of the cover surface (22).

* * * * *